Dec. 8, 1931. C. LEA Re. 18,277
LUBRICATING APPARATUS
Original Filed Jan. 31, 1923
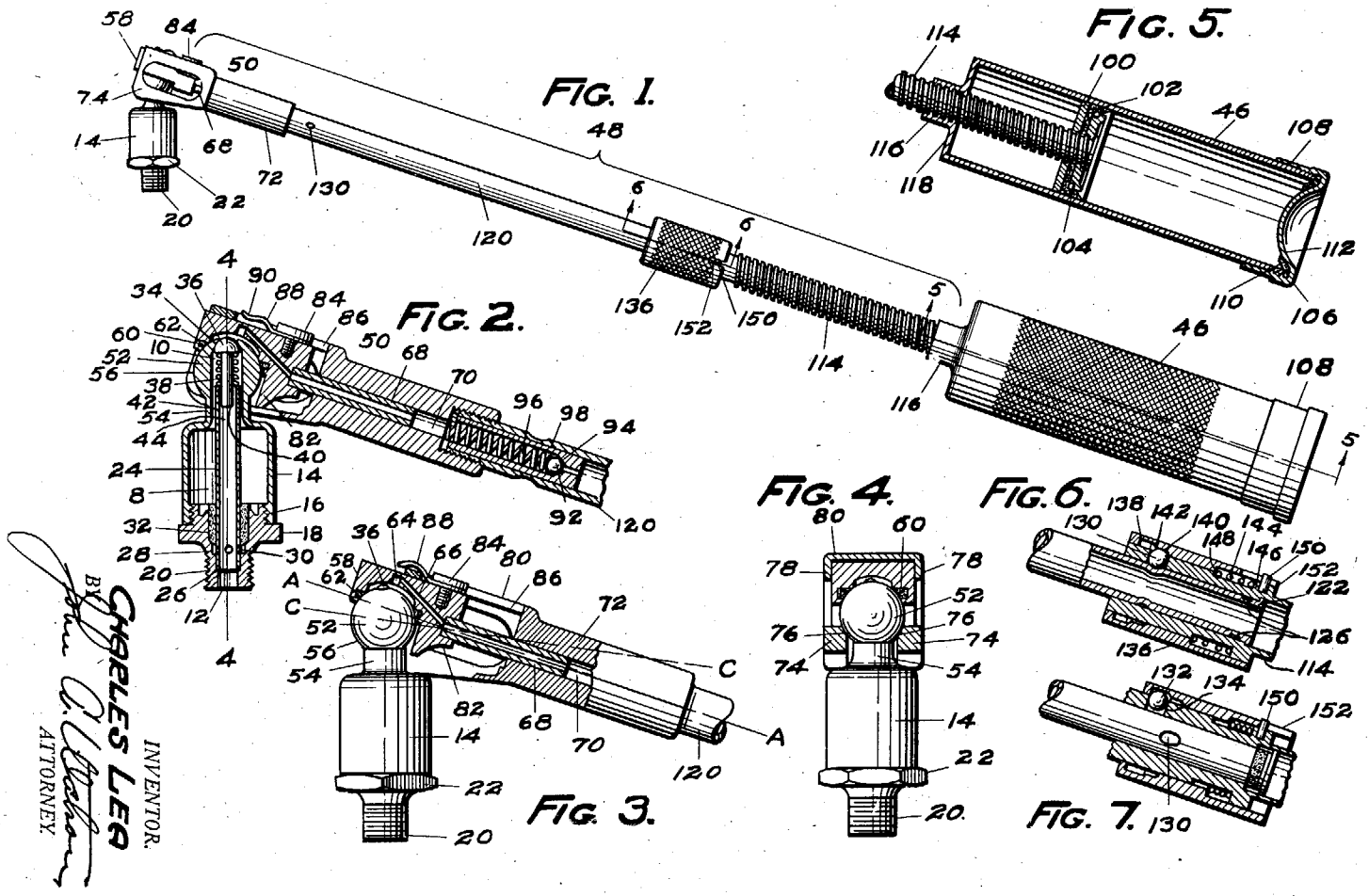
INVENTOR.
CHARLES LEA
BY John A. Watson
ATTORNEY.

Reissued Dec. 8, 1931

Re. 18,277

UNITED STATES PATENT OFFICE

CHARLES LEA, OF MILTON, MASSACHUSETTS, ASSIGNOR, BY MESNE ASSIGNMENTS, TO THE LUBRICATION CORPORATION, OF SOUTH BEND, INDIANA, A CORPORATION OF DELAWARE

LUBRICATING APPARATUS

Original No. 1,637,908, dated August 2, 1927, Serial No. 616,064, filed January 31, 1923. Application for reissue filed September 12, 1931. Serial No. 562,565.

This invention relates to the art of lubrication, it being more especially concerned with means for opening the closures of receptacles and introducing lubricant thereinto, and the invention aims to avoid the inconvenience, loss of time and other disadvantages, which have hitherto characterized the use of devices of this class. While the invention is susceptible of general application, it has more particular reference to the lubrication of various minor bearings of a motor car, such as spring bolts and other parts which are usually provided with grease or oil cups.

The invention will be best understood by reference to the following description, when taken in connection with the accompanying drawings of one illustrative embodiment thereof while its scope will be more particularly pointed out in the appended claims.

In the drawings:

Fig. 1 is a side elevation of a lubricating apparatus exemplifying the invention;

Fig. 2 is a vertical, longitudinal sectional view on an enlarged scale showing the parts which appear at the left-hand side of Fig. 1, the parts being shown in the positions which they occupy when the filler is fully attached to the receiver in readiness for filling the latter;

Fig. 3 is a view similar to Fig. 4, showing the filler preliminarily applied to the receiver, but before being secured thereto;

Figure 4 is a sectional view on line 4—4 of Fig. 2;

Fig. 5 is a sectional view on line 5—5 of Fig. 1;

Fig. 6 is a sectional view on line 6—6 of Fig. 1, showing the parts in their normal locked positions; and Fig. 7 is a view similar to Fig. 6, showing the locking sleeve retracted and the twe telescopic parts of the conduit unlocked from each other.

Referring to the drawings, and to the embodiment of the invention which is selected for exemplification, there is shown (see Fig. 2) a lubricant receiver, herein exemplified by an oil cup having a reservoir 8 provided with an inlet 10 and an outlet 12, the latter to be connected with the bearing to be lubricated. In the present example, the reservoir is formed as a part of a casing having a body 14, whose lower end is threaded as at 16 onto a base 18, which presents at its lower end a threaded nipple 20, in which the outlet 12 is formed. This nipple may be screwed into an opening leading to the bearing, and to facilitate this operation, the base 18 is herein provided with a polygonal portion 22 (see Fig. 3) to receive a wrench, not shown.

To ensure an ample supply of lubricant between the bearing surfaces, and to carry away foreign substances, provision is made for the initial flooding of the bearing under pressure, followed by a relatively slow feeding of oil therein. There are two passages leading to the outlet, one of them being presented by a tube 24 (see Fig. 2), the lower end of which is tightly fitted into the outlet passage 12, which presents a shoulder 26 to prevent the descent of the tube beyond its normal position. The other passage is presented by an annular chamber 28 formed in the base 18 about the tube 24, and communicating with the interior of the latter by one or more, herein a plurality, of openings 30 provided in the circumferential wall of the tube.

A slow feeding of oil to the bearing is permitted by a suitable permeable barrier, herein a ring 32 of porous felt or other appropriate construction, preferably forced into place and held there by friction, so that it may readily be removed and replaced by another. The proportions and density of the felt ring are selected to suit the particular conditions under which the oil cup is used, and if the rate of feed is not correct, the plug may be removed and a different one substituted therefor.

The inlet 10 presents a valve seat 34, which diminishes in cross-section toward the inlet orifice, and cooperating therewith is a suitable valve 36, herein having a generally hemispherical form, normally seated by a spring 38 helically coiled about a stem 40, which depends from the head of the valve. The upper end of the spring is seated against the under side of the valve head, and at its lower end against the upper end of the tube 24. The stem and internal surface of the tube are separated by an annular space 42, through which oil supplied to the inlet may be fed through the tube directly to the bearing, without passing through the slow feeding passage, which is restricted by the permeable barrier 32. When, however, the bearing has been flushed and has taken up all the oil which it will hold, the tube 24 overflows, and continued feeding of oil to the inlet causes the reservoir 8 to be filled through an annular passage 44 about the upper end of the tube. It should be understood, of course, that the valve 36 is in the nature of a check valve, which opens inwardly under the pressure of the oil, and when the pressure drops below a predetermined point, the valve is seated by its spring. The inlet of the reservoir is, therefore, normally closed, and is protected against the entrance of foreign matter. The working part which is thus lubricated can be started with the assurance of an ample supply of oil. Subsequently during the operation, a slow feeding of the oil takes place by way of the normal feeding device, herein by seepage through the felt ring, the density and proportions of which, as before stated, are such as to permit the proper rate of feeding to suit the particular circumstances.

The filler or oil gun will now be described, reference being had at first to Fig. 1. A reservoir 46 is provided for the lubricant, preferably oil, which is conducted therefrom through a conduit designated generally by the numeral 48, having a nozzle 50. The nozzle and oil cup have suitable cooperating means permitting one to be attached to the other in various angular relations of their longitudinal axes. This is highly desirable, especially in the lubrication of motor car chassis bearings, many of which are located at points difficult of access. By reason of the construction presently to be described, it is possible to reach with the filler from a remote point, attach the filler to the reservoir without the necessity of nicety of angular positioning of the filler, and couple them tightly together by the use of one hand grasping the filler at a remote point, such as by using the reservoir 46 as a handle, the filler being first loosely applied to the reservoir, and then by a forward motion clamped onto the latter. Subsequently, a movement of the reservoir in another direction ejects the oil therefrom through the conduit into the receiver.

The means for coupling the receiver to the filler will now be described, reference being had at first to Fig. 2. The receiver and filler present a separable, universal coupling, herein exemplified by a ball and socket joint. In the present example, the ball member is on the receiver, and the latter presents a head 52 jointed to the body by a neck 54. The head has an external surface 56, which is formed as a zone of a sphere. The socket member of the universal joint is presented by a cap 58, having an annular surface cooperating with the surface of the sphere to maintain a joint permitting a relative turning movement about the center of the sphere. In the present example, the annular surface is presented by a packing ring or washer 60 set into a recess 62 formed in the cap 58. The dimensions and relations of the parts just described are such that the filler is susceptible of application to the receiver through quite a considerable range of angular movement about the center of the sphere and as the mouth of the passage in the cap 58 is considerably greater than the opening or inlet into the nipple head 52 lubricant may be fed over a wide range from any angle or direction of approach within the range of approach permitted by the mechanical construction of the parts. The angular movement of the longitudinal axis A—A of the nozzle with relation to the longitudinal axis B—B of the oil cup is limited only by the presence of the neck below the spherical head. The range of movement about the longitudinal axis B—B of the cup is unlimited, and the nozzle can be applied thereto from any direction, subject only to the presence of any surrounding objects, such as parts of the chassis.

The cup is provided with a discharge orifice 64, which communicates with the inlet orifice of the oil cup throughout the range of adjustment of the nozzle, this opening being within the space bounded by the annular packing ring or washer 60, which, when firmly held in place on the spherical surface of the head, prevents leakage of oil past the washer. The orifice 64 receives its oil through an angular passage 66, which communicates with a tubular stem 68, the latter communicating with and having a snug working fit in a passage 70 extending lengthwise within a terminal or connector 72 forming a part of the conduit which conducts the oil from the reservoir to the receiver.

The means for clamping the cap onto the head will now be described, reference being had at first to Fig. 4. The terminal 72 is provided with a pair of arms 74, which embrace the neck and engage the spherical head at a zone intermediate the center of the latter and the neck. The engaging surfaces 76 of the arms with this zone are parts of a cylindrical surface whose diameter is the same as that of the sphere, and whose axis C—C is inclined with respect to the longitudinal axis A—A of the nozzle and the stem 68, which slides axially in the passage 70. Preferably the cap 58, in sliding to and fro with reference to the terminal 72, is guided not only by the stem 68 but by lateral guides 78 and a top guide 80 (see Fig. 4), all of which are parallel with the axis A—A. The cap is provided with a depending lug 82 (see Fig. 3), which serves as a stop to limit the forward movement of the cap with reference to the head. When, therefore, the cap is applied to the head (see Fig. 3), and the terminal 72 is pushed forward to some such position as that represented in Fig. 2, a relative sliding action between these parts takes place, and the inclined surfaces of the arms against the under side of the head act on the plate of a wedge to cause the cap to be forced downward onto the head, and to compress the washer 60, thereby affording a non-leaking joint between the cap and the head. The relative sliding motion of the head and the terminal is limited by a suitable stop, herein a screw 84, which plays to and fro in a slot 86 provided in the upper guide 80. It follows that the cap cannot be accidentally withdrawn entirely from the terminal, or forced out of the latter by the oil pressure against the inner end of the stem 68.

It is desirable that the cap shall be presented normally in its extreme forward position in readiness for application to the head, and yieldingly retained in such position against accidental rearward displacement, which would make it necessary to push it forward by hand. To this end, therefore, there is provided a yielding detent comprising a spring 88, which may be secured to the head by the screw 84, said spring presenting a knob 90 adapted to engage over the front end of the upper guide 86 (see Fig. 3) when the cap is in its forward position, thereby retaining the cap in place. When, however, the terminal 72 is thrust forward to the position represented in Fig. 2, this spring will yield in an upward direction, and become released from the guide.

Preferably, the outlet of the filler is valve-controlled, and in the embodiment shown has a normally closed check valve, herein a ball 92 cooperating with a valve seat 94, against which it is normally seated by a spring 96. This valve is opened by the pressure of the oil, and is closed by the spring when the pressure is removed. In the present example, the valve seat is formed as a part of a plug or bushing 98, inserted in the conduit now to be described in detail.

The conduit is laterally inflexible, so that by the use of one hand only the filler may be attached to the receiver. This makes it possible to use the filler in places where a two-hand operation would be difficult or inconvenient. Moreover, the expulsion of the oil from the receiver is preferably a one-hand operation, this being conveniently accomplished by making the reservoir in the form of a cylinder in which there is mounted (see Fig. 5) a piston 100, suitably attached to the inner end of the conduit. This piston is provided with a cup leather packing 102, whose free edge is directed rearwardly, and it may be urged into contact with the internal surface of the cylinder by a suitably arranged spring 104 put into place under compression.

The cylinder is provided with suitable means to permit the introduction of a supply of oil thereinto, and to that end, herein has a cover in the form of a cylinder head 106 provided with an annular flange 108 having screw-threaded engagement with the rear end of the cylinder. When the cover is screwed into place, a compressible packing ring or washer 110 prevents the escape of oil in a rearward direction. It is intended that the piston shall be moved to the front end of the cylinder, and the space at the rear of the piston then filled with oil by the removal of the cover, which is subsequently replaced.

To reduce to a minimum the amount of air at the rear of the piston, I preferably provide the cover with suitable means for displacing the air, the cover to that end being cupped inwardly as at 112 to whatever extent is necessary to ensure the expulsion of all the air in applying the cover. As the latter is being screwed into place, the air trapped in the cylinder makes its escape along the screw-threads of the flange, and when finally the packing ring brings up against the end of the cylinder, the latter is tightly sealed.

The exclusion of air from the rear end of the cylinder is important, because otherwise air and oil would come out together, and there would be a tendency to spill and spread the oil. The pressure of air would tend to cause some oil to be expelled after the pressure is released, thus wasting the oil and smearing things generally. When the air is excluded, the oil is delivered in a solid stream, and no oil will pass out of the nozzle after the pressure applied by the hand of the user ceases.

In this example, the relative movement of the piston and cylinder to cause the expulsion of the oil is effected by the use of a threaded engagement between the cylinder and the conduit, the latter herein comprising a section or tube 114 having screw-threaded engagement with a nut 116 conveniently formed as an integral part of a front cylinder head 118. This arrangement has the advantage of permitting the nozzle to be applied to the oil cup, and the latter to be opened by longitudinal movement of the cylinder and conduit, but without placing the oil under pressure, which would be apt to open the check valve 92 prematurely.

When the filler is used for automobiles, its length will be such that the user may reach in from some point desirably remote from the receiver, and then introduce the lubricant, thereby avoiding contact with the hands or clothing with the dirty or oily parts of the machine. The length of the conduit is such as to suit the particular circumstances. To save space in storing the filler when the latter is not in use, the conduit may be made telescopic, this being conveniently accomplished in the present example by providing a section or tube 120, telescoped within the section 114 and axially slidable therein. Preferably, the inner end of this section (see Fig. 6) is provided with an outwardly directed flange 122, adapted to cooperate with a shoulder 124 within the section 114 to prevent the inner section from being entirely withdrawn or forced in an outward direction by the pressure of the oil. Leakage of oil at the joint between the two sections may be prevented by the use of a suitable compressible packing ring 126 received in a circumferential groove 128 provided in the inner section 120, preferably just forward of the flange 122.

In applying the filler to the receiver, the user grasps the cylinder 46 and pushes the filler forward. Naturally, this tends to cause the two sections of the conduit to telescope one into the other. On the other hand, when subsequently the cylinder is rotated by the hand of the user to cause the expulsion of oil from the filler into the receiver, naturally there is a tendency for the two parts of the conduit to turn one on the other. To the end that these two tendencies may be resisted when the filler is in use, while still permitting the conduit to be collapsed instantly when it is desired to reduce the over-all dimensions of the filler for storage purposes, I have provided suitable means, which will now be described, reference being had to Figs. 6 and 7.

The inner conduit 120 is provided with one or more, herein a plurality, of depressions 130, any one of which may receive a locking conduit conveniently in the form of a ball 132, which is radially movable in an aperture 134, provided in the circumferential wall of the front terminal portion of the conduit section 114. The radial movement of the ball in the aperture is controlled by a sleeve 136, which encircles the conduit section 114, and is provided with two annular internal grooves 138 and 140, one of larger diameter than the other, and preferably connected by an inclined surface 142. When the sleeve is disposed in the position shown in Fig. 6, the smaller groove 140 registers with the ball 132, and prevents the latter from being displaced from the depression 130 in which it is received. When, on the other hand, the sleeve is moved rearwardly to the position represented in Fig. 7, the larger groove 138 is brought into alignment with the ball, and the latter is then free to move outward so that it may be disengaged from the depression 130 by simply moving the one conduit section lengthwise of the other. The helically coiled spring 144 is interposed between a shoulder 146 presented by the conduit section 114 and a shoulder 148 presented by the sleeve, and said spring constantly tends to urge the sleeve forward into the position represented in Fig. 6. Forward movement of the sleeve under the influence of the spring is limited by the inner end of the smaller circumferential groove 140 to cooperate with the ball 130. Movement of the sleeve in the opposite direction is limited by the forward end of the larger groove 138 cooperating with the ball 130. Rotation of the sleeve with relation to the conduit section 114 may be prevented by providing the latter with a pin 150 received in a longitudinal slot 152 provided in the sleeve. This pin and slot may serve to limit rearward movement of the sleeve, if desired.

When, now, the sleeve is positioned as shown in Fig. 5, the conduit sections are positively locked together, and therefore the user may grasp the cylinder 46 and urge the filler forward to attach the same to the receiver followed by rotation of the cylinder to fill the receiver, yet without relative movement of the conduit sections. When, on the other hand, the filler is to be stored, the conduit may be collapsed by first sliding the locking sleeve in a rearward direction, and then sliding the conduit sections one into the other. If desired, the forward conduit section 120 may be provided with one or more depressions 130′, similar to the depressions 130, to permit the sections to be locked in their collapsed position against accidental movement.

The general operation of the filler will now be described. The filler is first filled with oil in the manner hereinbefore described. The cylinder presents a nipple which is grasped by one hand of the user, who then loosely applies the filler to the receiver by reaching the filler forward and placing the cap of the filler on the head of the receiver. The user then pushes the cylinder forward, thereby causing the forward terminal of the conduit to advance with relation to the cap, during which advance the cap is firmly clamped onto the head, and the packing washer in the cap is compressed to prevent leakage of oil. A fluid-tight connection between the filler and the receiver having been established, pressure is applied to the oil in the filler by simply turning the cylinder through the angular distance necessary to expel the desired amount of oil. When the proper amount has been introduced, the cylinder is rotated slightly in the reverse direction to cause a cessation of the pressure, whereupon the check valves in the filler and the receiver close under the influence of their respective springs. The filler may then be detached from the receiver by simply moving the cylinder in a rearward direction.

Having thus described one embodiment of my invention, but without having limited myself thereto, what I claim and desire by Letters Patent to secure is:

1. In a lubricating apparatus, the combination of a receiver and a filler comprising a lubricant reservoir and a connector for connecting the reservoir and receiver, the receiver end of said connector being connectible with the receiver and adapted to be applied to and to fill said receiver, said receiver presenting a surface which is a zone of a sphere and the said connector end presenting an annular surface cooperating therewith, and means to lock said receiver and connector end together and to maintain a joint permitting relative turning movement about the center of said sphere, said receiver and connector end presenting a separable coupling affording a conduit for the lubricant in its passage from said reservoir to said receiver, one of the limiting planes of said annular surface lying at an angle other than a right angle to the general direction of extension of said connector.

2. In a lubricating apparatus, the combination of a receiver and a filler adapted to be applied to and to fill said receiver, said receiver and filler comprising separable coupling members having provision for attachment of one to the other in various angular relations of their longitudinal axes, and means for limiting rotation of one of said members about its said longitudinal axis with relation to the other member, said receiver presenting a surface that is a zone of a sphere with a lubricant receiving orifice of relatively small diameter compared to the diameter of said receiver surface and said filler presenting an annular surface cooperative to make sealing engagement with said receiver surface, the shortest diameter of the annular engaging surface of said filler being relatively greater than the diameter of said receiving orifice.

3. In a lubricating apparatus, the combination of a receiver having a lubricant receiving orifice and a filler adapted to be applied to and to fill said receiver, said receiver presenting a head and a neck, said head having a surface which is a zone of a sphere, and the filler presenting an annular surface cooperating therewith to maintain a joint permitting a relative turning movement about the center of said sphere, and means embracing said neck and cooperating with said head to secure the receiver and filler together, the smallest small circle of said annular surface being of considerably greater diameter than the diameter of said orifice.

4. In a lubricating apparatus, the combination of a receiver having a head and a neck presenting a passage extending through said neck and having an inlet in said head; and a filler comprising two members, one adapted to engage said head at top and bottom, respectively, and to telescope relatively to each other in a direction transverse to said neck, the member which engages the top of said head presenting a passage adapted to communicate with said receiver passage.

5. In a lubricating apparatus, the combination of a receiver having a head and a neck presenting a passage extending through said neck and having an inlet in said head; and a filler comprising two members, one adapted to engage said head at top and bottom, respectively, and to telescope relatively to each other transverse to said neck, one of said members having means rendered effective by movement of such member in one direction transversely of said neck to cause said members to clamp said head therebetween, one of said members presenting a passage adapted to communicate with the passage in said receiver, the mouth of the passage in said clamp member being considerably wider than the greatest width of the mouth of the inlet in said head.

6. In a lubricating apparatus, the combination of a receiver having a head and a neck presenting a passage extending through said neck and having an inlet in said head; and a filler comprising two members, one adapted to engage said head at top and bottom, respectively, and to telescope relatively to each other transverse to said neck, one of said members having means rendered effective by movement of such member in one direction transversely to said neck to cause said members to clamp said head therebetween, said members presenting passages communicating with each other and with the passage in said receiver.

7. In a lubricating apparatus, the combination of a receiver having a head and a neck presenting a passage extending through said neck and having an inlet in said head; and a filler comprising two relatively telescopic members having provision, by relative telescopic movement transversely of said neck, to clamp said head therebetween, and detent means normally to retain said members in a definite relative position with respect to their relative telescopic movement.

8. In a lubricating apparatus, the combination of a receiver having a head and a neck presenting a passage extending through said neck and having an inlet in said head; and a filler comprising two relatively telescopic members, having provision, by relative telescopic movement transversely of said neck, to clamp said head therebetween, and detent means normally to retain said members in a relatively extended position considered with respect to their relative, telescopic movement.

9. In a lubricating apparatus, the combination of a receiver having a head and a neck presenting a passage extending through said neck and having an inlet in said head; and a filler comprising two relatively telescopic members, having provision, by relative telescopic movement transversely of said neck, to clamp said head therebetween, and a spring detent normally to retain said members in a relatively extended position considered with reference to their relative, telescopic movement, said detent having provision to yield and to permit such movement upon the application of the sufficient degree of force on one member relatively to the other.

10. In a lubricating apparatus, the combination of a receiver having a spherical head and a neck presenting a conduit extending through said neck and having an inlet in said head; and a filler comprising two relatively telescopic members, one presenting a socket to receive said head, and the other presenting surfaces adapted to embrace said neck and to cooperate with said head to utilize movement of such member transversely of said neck and relatively to the other member to urge the latter into firm engagement with said head, said members presenting relatively telescopic conduits, communicating with each other and adapted to communicate with said conduit in said receiver.

11. In a lubricating apparatus, the combination of a receiver having a spherical head and a neck presenting a conduit extending through said neck and having an inlet in said head; and a filler comprising two relatively telescopic members, one presenting a socket to receive said head, and the other having a pair of arms adapted to embrace said neck and presenting surfaces engageable with the under side of said head and inclined with respect to the path of relative telescopic movement of said members, thereby to utilize such movement to cause said members to clamp said head therebetween, said members presenting relatively telescopic conduits communicating with each other and adapted to communicate with said conduit in said receiver.

In witness whereof, I have affixed my signature.

CHARLES LEA.